United States Patent Office 2,950,961
Patented Aug. 30, 1960

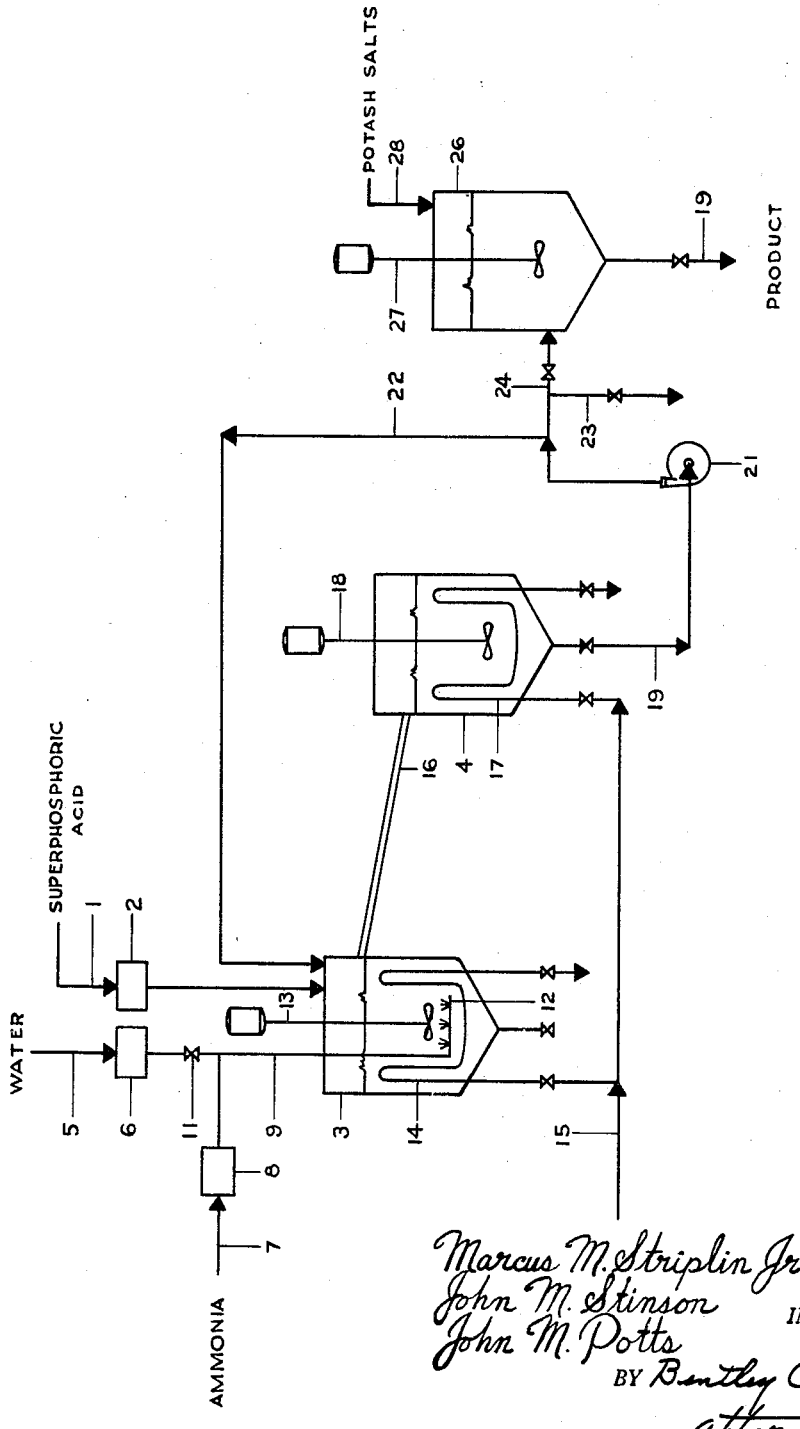

2,950,961

PRODUCTION OF LIQUID FERTILIZERS

Marcus M. Striplin, Jr., Florence, John M. Stinson, Sheffield, and John M. Potts, Florence, Ala., assignors to Tennessee Valley Authority, a corporation of the United States Filed Nov. 23, 1956, Ser. No. 624,177

11 Claims. (Cl. 71—42)

(Granted under Title 35, U.S. Code (1952), sec. 266)

The invention herein described may be manufactured and used by or for the Government for governmental purposes without the payment to us of any royalty therefor.

This invention is an improvement in liquid fertilizers and an improved process for their production.

Liquid mixed fertilizers having compositions similar to those of standard dry mixed fertilizers are well known and are increasing in popularity. Such solutions have the advantages over dry mixed fertilizers in that costs of evaporating water and of bagging are eliminated and application to soil is simplified. Moreover, use of liquid fertilizers eliminates the difficulties due to segregation and caking often encountered in storing dry fertilizers.

However, liquid fertilizers have had some outstanding disadvantages. Raw-material costs have been relatively high and the solutions produced have been so corrosive as to result in high maintenance and storage costs. The solutions also have been limited to a maximum plant-food content of 33 percent because concentration in excess of this amount always has resulted in crystallization and precipitation of salts. These disadvantages often outweigh the benefits to be derived by elimination of evaporation and bagging steps.

It is an object of this invention to provide improved stable liquid mixed fertilizers containing more than 33 percent total plant food.

Another object is to provide such fertilizers in which no crystallization and precipitation occur on long storage.

Another object is to provide such fertilizers which are easily pumpable, have low viscosity, and have greatly reduced corrosiveness.

Another object is to provide a process for the manufacture of such fertilizers which is simple and cheap to carry out, which does not involve excessive equipment costs, and which utilizes relatively cheap raw materials.

Other objects and advantages will become apparent from this disclosure.

We have found that these objects are attained in a process which comprises introducing water, ammonia, and superphosphoric acid into a reaction zone; therein rapidly and intimately mixing them at a temperature in the range from 55° F. to about 125° F.; controlling the proportions of water, ammonia, and superphosphoric acid introduced to produce a clear solution containing more than 33 weight percent total $(N+P_2O_5)$. We prefer to add sufficient ammonia to bring the pH of the solution into the range from about 5.0 to 6.65, as corrosion is minimized in this range; but a more acid solution may be produced if desired. Also, we prefer to add sufficient water to bring the specific gravity of the solution into the range from 1.34 to 1.45; but specific gravities above and below this range may be used. The total $(N+P_2O_5)$ ordinarily will be in the range from 33 to about 60 weight percent, but may exceed 60 percent when excess superphosphoric acid is used.

The term "superphosphoric acid" used in this specification and claims is defined as a phosphoric acid containing substantial quantities of both ortho- and polyphosphoric acids. These polyphosphoric acids include pyrophosphoric acid and other polymers from the tri- to the nonapolymer and higher. The proportions of polyphosphoric acids vary with the $P_2O_5$ content of the superphosphoric acid. The Canadian Journal of Chemistry, vol. 34 (1956), page 790, shows that superphosphoric acid in the range from 69.81 to 84.95 percent $P_2O_5$ contains the following proportions of orthophosphoric acid and polyphosphoric acids, expressed as percent of total phosphorus.

97.85 to 2.32 percent ortho-
2.15 to 49.30 percent pyro-
0.00 to 24.98 percent tri-
0.00 to 16.99 percent tetra-
0.00 to 12.64 percent penta-
0.00 to 9.75 percent hexa-
0.00 to 8.62 percent hepta-
0.00 to 7.85 percent octa-
0.00 to 6.03 percent nona-
0.00 to 29.41 percent higher polymers The higher polymers are not present in the lower part of the $P_2O_5$ content range given above. For example, at a $P_2O_5$ content below 78 percent, there are no appreciable quantities of polyphosphoric acids above the pentapolymer, and below 80 percent $P_2O_5$ no polymers above the heptapolymer have been found.

Ordinarily, we prefer to use a superphosphoric acid containing from about 70 percent $P_2O_5$, i.e., containing about 97 percent orthophosphoric and about 3 percent pyrophosphoric acids, to about 85 percent $P_2O_5$, containing about 2.3 percent ortho-, 6.9 percent pyro-, 7.7 percent tri-, 11 percent tetra-, 10.5 percent penta-, 9.6 percent hexa-, 8.6 percent hepta-, 7.8 percent octa-, 6 percent nonaphosphoric acids, and 29 percent or more of polyphosphoric acids above the nonapolymer. Within this range, we prefer to use a superphosphoric acid containing about 75 to 77 percent $P_2O_5$, i.e., having a specific gravity of 1.90 to 1.94 at 80° F., because acid of this strength remains fluid and easily pumpable at all ordinary outdoor temperatures. Superphosphoric acid containing about 75 to 77 percent $P_2O_5$ contains about 56 to 40 percent orthophosphoric acid, about 39 to 47 percent pyrophosphoric acid, about 5 to 11 percent tripolyphosphoric acid, and about 0 to 2 percent of the tetrapolymer of phosphoric acid.

Superphosphoric acid may be prepared by dissolving excess $P_2O_5$ in orthophosphoric acid, by evaporating water from orthophosphoric acid, or by operating equipment ordinarily used for the manufacture of orthophosphoric acid from phosphorus at higher temperatures so as to react less water with the $P_2O_5$ produced.

We have found that the product of our process is a stable, noncorrosive liquid mixed fertilizer containing more than 33 weight percent $(N+P_2O_5)$ and containing ammonium salts of ortho- and polyphosphoric acids in substantially the same proportions as the proportions of these acids in the superphosphoric acid used in our process.

The attached drawing is a flow sheet illustrating diagrammatically principles of our novel process, which results in a liquid fertilizer having the properties mentioned above.

In the single figure superphosphoric acid from a source not shown is fed through line 1 and any suitable means for controlling the rate of flow 2 into a reaction zone comprising vessels 3 and 4. Water and ammonia are fed into vessel 3 through lines 5 and 7 containing means for controlling rates of flow 6 and 8, respectively. Controlled streams of ammonia and water may be combined as in line 9, if desired, or may be fed separately into vessel 3 if more convenient. The ammonia may be fed as liquid ammonia, gaseous ammonia, ammonium hydroxide solution, or a combination of these materials. If ammonium hydroxide solution is used, the introduction of additional water should be entirely discontinued by closing valve 11 in line 5, since all water required will be contained in the solution. In fact, 58 percent ammonium hydroxide solution contains so much water that it is impractical to make liquid fertilizers containing more than about 44 percent total plant food, i.e., 11–33–0, if it is used as the sole source of ammonia. When more concentrated fertilizer solutions are desired, e.g., about 60 percent total plant food, liquid or gaseous ammonia should be used, either alone, or in combination with each other, or in combinations with ammonium hydroxide. It is always necessary to feed some water when gaseous or liquid ammonia is used, since the reaction product is otherwise a semisolid, unpumpable mass.

In any case, water and ammonia enter vessel 3 through a suitable distributing device 12, such as a perforated line or spider located near the bottom of vessel 3. Vessel 3 is equipped with a motor-driven agitator running at such speed as to secure rapid and intimate mixing of acid, ammonia, and water, and to keep the resulting mixture in vigorous agitation until reaction is complete. Cooling coils 14 are located with vessel 3 and preferably are disposed in a bafflelike arrangement to increase the degree of agitation resulting from the action of agitator 13. We prefer to introduce a stream of superphosphoric acid at a steady rate of flow according to the capacity of the equipment and to vary the rates of introduction of water and ammonia as may be necessary to give a specific gravity and pH, respectively, in the desired ranges. The specific gravity ordinarily will be from 1.26 to 1.45 at 80° F. when the pH of the solution is in the preferred range from 5.0 to 6.65, but when it is desired to add excess superphosphoric acid having a specific gravity of 1.9 or more to bring the pH below 5.0 the specific gravity of the finished solution may be well above 1.45 at 80° F.

The temperature of the reacting mixture is maintained in the range from about 55° F. to 125° F. by circulating a suitable coolant through coils 14. We prefer to operate at a temperature of about 100° F., or even a few degrees higher, since this coolant then can be water at ordinary temperatures admitted from line 15. At temperatures near the lower end of the operable range it is necessary to use brine, chilled by refrigeration, as coolant. This adds to the cost of equipment and operation, but improvement in the properties of the finished fertilizer solutions has not been observed to result.

The temperature, however, can go only a very little above 100° F. when stability for long periods is desired. We have found that at 116° F. and above hydrolysis of the superphosphoric acid is fairly rapid, and concentrated fertilizer solution of 12–36–0 grade prepared at such a temperature is stable for about 2 weeks only. Longer storage results in precipitation of some diammonium phosphate from the solution.

The resulting mixture overflows from vessel 3 via line 16 to a second vessel 4 similar to vessel 3. This vessel also is equipped with cooling coils 17 and an agitator 18, although coils 17 may be omitted if the coils 14 in vessel 3 have sufficient heat-transfer surface. Temperature in vessel 4 is maintained in the same range as that in vessel 3. Rapid and intimate mixing by vigorous agitation also is maintained in vessel 4. The resulting solution is drawn off via line 19 and pump 21. A part of this solution is recycled to vessel 3 via line 22.

The purpose of the pair of mixing vessels 3 and 4 is merely to insure thorough and intimate mixing during the entire time necessary for the reaction to go to completion, and to control the temperature accurately. We do not mean to exclude the possibility of conducting the entire mixing and reaction in a single vessel with either continuous or batch-type operation, but we have found that it is somewhat easier to secure adequate mixing and accurate temperature control by the use of two vessels and recycle as shown.

We have found that the reaction is very rapid, but a long mixing time may be used without any bad effect. Also, we have found that although hydrolysis of the superphosphoric acid occurs when the acid stands for some time in contact with water, there is substantially no hydrolysis under the conditions described above. Ammonium salts of ortho-, pyro-, and other polyphosphoric acids are formed in substantially the same proportions in which these acids are present in the feed. Once the ammonium salts are formed the resulting solution, having a specific gravity above 1.26 at 80° F., remains clear and stable for many weeks at ordinary room temperature, and there is no precipitation even though cooled at about 28° F. for over a month.

Finished solution drawn from vessel 4 via line 19 by pump 21 may be withdrawn as product via line 23 when grades of fertilizer such as 11–33–0 or 12–36–0, containing no potash, are desired. The finished solution withdrawn from vessel 4 frequently may be a little offgrade, i.e., it may contain a little less nitrogen than is required for an $N:P_2O_5$ weight ratio of exactly 1:3. This is due to the fact that ammoniation of the superphosphoric acid to a final pH in the range of 5.0 to 6.65 usually does not furnish quite enough nitrogen for the 1:3 ratio. While we have found that the final pH cannot exceed about 6.65 if the solution is to be stable, this slight deficiency of nitrogen may be corrected easily. The solution is led into vessel 26 and sufficient ammonium nitrate or urea is there dissolved in it to bring the ratio up to 1:3. Alternatively, a little ammonia-ammonium nitrate solution may be fed with the water introduced via line 7. The small quantity of ammonium nitrate or urea required has not affected the stability of the finished solution.

When it is desired to dissolve potash in the solution, the solution is passed via line 24 to a suitable mixing vessel 26 equipped with an agitator 27. Potash is then introduced at 28 and is dissolved in the solution by agitation. We have prepared a 7–21–7 grade fertilizer in this manner which remained in clear solution for 9 weeks when stored at room temperature and at 28° F., whereas we believe that 6–18–6 is the highest formulation usable in a liquid fertilizer prior to our discovery.

The following examples are illustrative of processes for the preparation of our liquid mixed fertilizers.

*Example I*

A pilot plant was constructed as shown in the attached drawing, except that all finished solution not recycled was withdrawn by a drain, corresponding to line 23, draining into the open top of a vessel corresponding to vessel 26. This vessel was of such size that it could be picked up and dumped manually at intervals. When no additives were incorporated, it served merely as a collecting vessel for finished solution. When additives such as potash salts, ammonium nitrate, or urea were used, they were incorporated in this vessel by agitation with a detachable electric stirrer.

Superphosphoric acid having a concentration from 75 to 77 percent $P_2O_5$ was fed into the top of a vessel corresponding to vessel 3 through a vertical line. Rate of flow was controlled by a conventional constant-level device. Water also was fed into the top of this vessel through a vertical line containing a standard meter. Ammonia metered by a conventional orifice device was fed into the bottom of the vessel through a ring-shaped perforated pipe. The vessels corresponding to 3 and 4 in the drawing were equipped with motor-driven agitators, and with vertical cooling coils arranged near the walls of the vessels with the planes of the coils disposed radially, thus exerting a baffling action that increased the mixing action of the agitators.

A large number of runs were made using the procedure described above. The following are typical of the results obtained in producing solutions of approximately 12–36–0 grade.

| Run | A | B |
|---|---|---|
| Temperature of mixing, °F | 75 | 100 |
| pH of final solution | 6.4 | 6.3 |
| Production rate, gal./hr | 2.8 | 2.8 |
| Specific gravity of final solution at 80° F | 1.388 | 1.390 |
| Total N in final solution, percent by weight | 11.5 | 11.3 |
| Total $P_2O_5$ in final solution, percent by weight | 36.6 | 36.9 |
| Orthophosphate $P_2O_5$ in final solution, percent by weight | 15.4 | 15.6 |
| Total quantity made, gallons | 16 | 17 |

Samples of all solutions were stored at room temperature and at a temperature from 28° to 32° F. for periods of 6 weeks. No crystallization occurred. The solutions remained clear, almost water-white, and of low viscosity.

Corrosion tests on mild steel were made using the finished solutions. The results averaged about 3 mils per year, i.e., about one-twentieth the penetration usually considered permissible with mild steel equipment.

*Example II*

Runs were made to test the feasibility of preparing the finished solution in a single vessel corresponding to vessel 3 in the drawings. Superphosphoric acid, water, and ammonia were fed as described in Example I. The overflow from line 16 was collected as the final solution. The following results were obtained in one run.

| | |
|---|---|
| Temperature of mixing, °F. | 100 |
| pH of final solution | 6.5 |
| Production rate, gal./hr. | 4.5 |
| Specific gravity of final solution at 80° F. | 1.420 |
| Total N in final solution, percent by weight | 11.3 |
| Total $P_2O_5$ in final solution, percent by weight | 36.2 |
| Orthophosphate $P_2O_5$ in final solution, percent by weight | 14.9 |
| Total quantity made, gallons | 15.5 |

This run and several others gave excellent results and finished solutions that were stable with no precipitates formed on long standing. Our results show that it is feasible to produce stable solutions of about 12–36–0 grade in a single vessel, provided there is immediate and intimate mixing of reactants secured by sufficiently strong agitation.

*Example III*

Ammonia, water, and superphosphoric acid containing 75 to 77 percent $P_2O_5$ were fed into the first of the two mixing vessels described in Example I. Rates of feed of ammonia and acid were controlled by observing the pH of the solution withdrawn from the second vessel. The rate of water addition was controlled to maintain the specific gravity of the withdrawn solution in the range from 1.39 to 1.40 at 80° F.

The following results are typical of those obtained in runs of this type.

| | |
|---|---|
| Temperature of mixing, °F. | 55 |
| pH of withdrawn solution | 6.6 |
| Production rate, gal./hr. | 3.5 |
| Specific gravity of withdrawn solution at 80° F. | 1.396 |
| Total N, percent by weight | 11.5 |
| Total $P_2O_5$, percent by weight | 35.3 |
| Orthophosphate $P_2O_5$, percent by weight | 15.2 |
| Total quantity made, gallons | 50 |

This solution was drained into a vessel corresponding to vessel 26 in the drawing. Therein portions of the solution were mixed with water and white muriate of potash in the proportions of 100 pounds of solution to 19 pounds of KCl to 45 pounds of water. This final solution was of grade 7–21–7 and had a final pH of 6.65. It was clear and of low viscosity. Samples of this solution were stored at room temperature and also in a cold room at 28° to 32° F. for 9 weeks. No crystallization or cloudiness developed in the stored samples.

*Example IV*

Liquid fertilizers of various grades were prepared on small scale. The mixing vessel used was merely a glass beaker partially submerged in a cooling bath. A measured amount of superphosphoric acid was placed in the beaker and allowed to come to the indicated temperature. Water was added slowly from a burette and ammonia was added at the bottom of the beaker. Vigorous mixing and agitation were obtained by use of a glass impeller driven by an air motor. The following results are typical of those obtained in preparing 11–33–0 and 12–36–0 solutions batchwise in this manner.

| Approximate grade of solution | 12–36–0 | 11–33–0 | 11–33–0 |
|---|---|---|---|
| Average temperature of solution, °F | 59 | 81 | 98 |
| pH of solution | 6.3 | 6.5 | 6.6 |
| Specific gravity of solution at 80° F | 1.392 | 1.360 | 1.362 |
| Materials, grams: | | | |
| Superphosphoric acid | 400 | 300 | 400 |
| Ammonia gas (calculated) | 123 | 94 | 123 |
| Water | 321 | 308 | 404 |
| Percent of phosphate in ortho form | 50 | 50 | 51 |
| Condition on storage for 9 weeks: | | | |
| Room temperature | Liquid | Liquid | Liquid |
| Cold room (28°–32° F.) | Liquid | Liquid | Liquid |

By adding a slight excess of superphosphoric acid, stable solution of grade 12–40–0 was prepared. This latter solution had a specific gravity of 1.434 at 80° F., and a pH of 5.7; it was stored at room temperature and at 28° to 32° F. for over 5 weeks without crystallization.

*Example V*

More concentrated liquid fertilizers, of grades approximately 14–42–0 and 15–45–0, were prepared on small scale. The procedure used was the same as that described in Example IV, except that all water supplied was contained in 58 percent ammonium hydroxide solution, a separate stream of gaseous ammonia also was introduced, and the superphosphoric acid used had a strength equivalent to 85 percent $P_2O_5$. This acid contained approximately 2.3 percent ortho-, 7 percent pyro-, 7.7 percent tri-, 11 percent tetra-, 10.4 percent penta-, 9.6 percent hexa-, 8.6 percent hepta-, 7.8 percent octa-, 6 percent nonaphosphoric acids, and about 29 percent of polyphosphoric acid polymers above the nonapolymer.

The following results were obtained.

| Approximate grade of solution | 14–42–0 | 15–45–0 |
|---|---|---|
| Temperature of reaction, °F | 100 | 85–100 |
| Final pH | 6.4 | 6.1 |
| Specific gravity at 80° F | 1.40 | 1.45 |

The 14–42–0 solution remained clear and fluid, although somewhat viscous, on storage at room temperature and at 28° to 32° F. The 15–45–0 material was a clear viscous solution when stored at room temperature, but solidified at 28° F. It was easily liquefied on warming. It was apparent that such concentrated solutions are stable, noncorrosive, and nonsegregating; but ease of application to soil would be improved by diluting them with a little water immediately before spraying them onto soil. The cost of shipping water eliminated by use of such concentrated solutions more than offsets the cost of diluting before application.

We claim as our invention:

1. A process for preparing a liquid mixed fertilizer having a total plant-food content above 33 weight percent which comprises introducing water, ammonia, and superphosphoric acid into a reaction zone; therein rapidly and intimately mixing them; controlling the proportions of water, ammonia, and superphosphoric acid introduced so that the pH and specific gravity of the resulting solution are in the ranges from 5.0 to 6.65 and from 1.26 to 1.45 at 80° F., respectively; maintaining the temperature of the solution in the range from 55° to about 125° F. during mixing; and withdrawing a stable fertilizer solution containing from 33 to 60 weight percent total $(N+P_2O_5)$ from the mixing zone.

2. A process for preparing a liquid mixed fertilizer having a total plant-food content above 33 weight percent which comprises introducing water, ammonia, and superphosphoric acid containing 75 to 77 weight percent $P_2O_5$ into a reaction zone; therein rapidly and intimately mixing them; controlling the proportions of water, ammonia, and superphosphoric acid introduced so that the pH and specific gravity of the resulting solution are in the ranges from 5.0 to 6.65 and from 1.26 to 1.45 at 80° F., respectively; maintaining the temperature of the solution in the range from 55° to about 125° F. during mixing; and withdrawing a stable fertilizer solution containing from 33 to 60 weight percent total $(N+P_2O_5)$ from the reaction zone.

3. A process for preparing a liquid mixed fertilizer having a total plant-food content above 33 weight percent which comprises introducing water, ammonia, and superphosphoric acid containing 75 to 77 weight percent $P_2O_5$ into a reaction zone; therein rapidly and intimately mixing them; controlling the proportions of water, ammonia, and superphosphoric acid introduced so that the pH and specific gravity of the resulting solution are in the ranges from 5.0 to 6.65 and from 1.26 to 1.45 at 80° F., respectively; maintaining the temperature of the solution at about 100° F. during mixing; and withdrawing a stable fertilizer solution containing from 33 to 60 weight percent total $(N+P_2O_5)$ from the reaction zone.

4. A process for preparing a liquid mixed fertilizer having a total plant-food content above 33 weight percent which comprises introducing water, ammonia, and superphosphoric acid containing 75 to 77 weight percent $P_2O_5$ into a reaction zone; therein rapidly and intimately mixing them; controlling the proportions of water, ammonia, and superphosphoric acid introduced so that the pH and specific gravity of the resulting solution are in the ranges from 5.0 to 6.65 and from 1.26 to 1.45 at 80° F., respectively; maintaining the temperature of the solution in the range from 55° to about 125° F. during mixing; withdrawing a stable fertilizer solution containing from 33 to 60 weight percent total $(N+P_2O_5)$ from the reaction zone; and adding a sufficient quantity of a material selected from the group consisting of ammonium nitrate and urea to the withdrawn solution to adjust the $N:P_2O_5$ weight ratio to 1:3.

5. A process for preparing a liquid mixed fertilizer having a total plant-food content above 33 weight percent which comprises introducing water, ammonia, and superphosphoric acid containing 75 to 77 weight percent $P_2O_5$ into a reaction zone; therein rapidly and intimately mixing them; controlling the proportions of water, ammonia, and superphosphoric acid introduced so that the pH and specific gravity of the resulting solution are in the ranges from 5.0 to 6.65 and from 1.43 to 1.44 at 80° F., respectively; maintaining the temperature of the solution in the range from 55° to about 125° F. during mixing; withdrawing a resulting stable fertilizer solution containing from 33 to 60 weight percent total $(N+P_2O_5)$ from the reaction zone; and adding water and muriate of potash to the withdrawn solution in quantity sufficient to form a solution having a total $(N+P_2O_5+K_2O)$ content of more than 33 weight percent.

6. A stable, substantially noncorrosive liquid mixed fertilizer of low viscosity having a pH in the range of about 5.0 to 6.65, containing from about 33 weight percent to about 60 weight percent total $(N+P_2O_5)$, consisting essentially of an aqueous solution of ammonium salts of superphosphoric acid and in which the total $P_2O_5$ content is distributed in the following proportions: 2.32 to 97.85 percent as ammonium orthophosphates, 2.15 to 49.30 percent as ammonium pyrophosphates, in amounts up to 24.98 percent as ammonium tripolyphosphates, in amounts up to 16.99 percent as ammonium tetrapolyphosphates, in amounts up to 12.64 percent as ammonium pentapolyphosphates, in amounts up to 9.75 percent as ammonium hexapolyphosphates, in amounts up to 8.62 percent as ammonium heptapolyphosphates, in amounts up to 7.85 percent as ammonium octapolyphosphates, in amounts up to 6.03 percent as ammonium nonapolyphosphates, and in amounts up to 29.41 percent as higher ammonium polyphosphates.

7. A stable, substantially noncorrosive liquid mixed fertilizer of low viscosity having a pH in the range of about 5.0 to 6.65, containing about 11 weight percent N and about 33 weight percent $P_2O_5$, consisting essentially of an aqueous solution of ammonium salts of superphosphoric acid and in which the total $P_2O_5$ content is distributed in the following proportions: 2.32 to 55.81 percent as ammonium orthophosphates, 6.97 to 49.30 percent as ammonium pyrophosphates, 5.31 to 24.98 percent as ammonium tripolyphosphates, in amounts up to 16.99 percent as ammonium tetrapolyphosphates, in amounts up to 12.64 percent as ammonium pentapolyphosphates, in amounts up to 9.75 percent as ammonium hexapolyphosphates, in amounts up to 8.62 percent as ammonium heptapolyphosphates, in amounts up to 7.85 percent as ammonium octapolyphosphates, in amounts up to 6.03 percent as ammonium nonapolyphosphates, and in amounts up to 29.41 percent as higher ammonium polyphosphates.

8. A stable, substantially noncorrosive liquid mixed fertilizer of low viscosity having a pH in the range of about 5.0 to 6.65, containing about 12 weight percent N and about 36 weight percent $P_2O_5$, consisting essentially of an aqueous solution of ammonium salts of superphosphoric acid and in which the total $P_2O_5$ is distributed in the following proportions: 2.32 to 39.86 percent as ammonium orthophosphates, 6.97 to 49.30 percent as ammonium pyrophosphates, 7.74 to 24.98 percent as ammonium tripolyphosphates, 2.28 to 16.99 percent as ammonium tetrapolyphosphates, in amounts up to 12.64 percent as ammonium pentapolyphosphates, in amounts up to 9.75 percent as ammonium hexapolyphosphates, in amounts up to 8.62 percent as ammonium heptapolyphosphates, in amounts up to 7.85 percent as ammonium octapolyphosphates, in amounts up to 6.03 percent as ammonium nonapolyphosphates, and in amounts up to 29.41 percent as higher ammonium polyphosphates.

9. A stable, substantially noncorrosive liquid mixed fertilizer of low viscosity having a pH in the range of about 5.0 to 6.65, containing about 12 weight percent N and about 40 weight percent $P_2O_5$, consisting essentially of an aqueous solution of ammonium salts of superphosphoric acid and in which the total $P_2O_5$ is distributed in the following proportions: 2.32 to 26.91 percent as ammonium orthophosphates, 6.97 to 49.30 percent as ammonium pyrophosphates, 7.74 to 24.98 percent as ammonium tripolyphosphates, 5.33 to 16.99 percent as ammonium tetrapolyphosphates, 1.60 to 12.64 percent as ammonium pentapolyphosphates, in amounts up to 9.75 percent as ammonium hexapolyphosphates, in amounts up to 8.62 percent as ammonium heptapolyphosphates, in amounts up to 7.85 percent as ammonium octapolyphosphates, in amounts up to 6.03 percent as ammonium nonapolyphosphates, and in amounts up to 29.41 percent as higher ammonium polyphosphates.

10. A stable, substantially noncorrosive liquid mixed fertilizer of low viscosity having a pH in the range of about 5.0 to 6.65, containing about 14 weight percent N and about 42 weight percent $P_2O_5$, consisting essentially of an aqueous solution of ammonium salts of superphosphoric acid and in which the total $P_2O_5$ is distributed in the following proportions: 24.43 to 26.91 percent as ammonium orthophosphates, 48.29 to 49.30 percent as ammonium pyrophosphates, 16.85 to 18.27 percent as ammonium tripolyphosphates, 5.33 to 6.75 percent as ammonium tetrapolyphosphates, and 1.60 to 2.26 percent as ammonium pentapolyphosphates.

11. A stable, substantially noncorrosive liquid mixed fertilizer of low viscosity having a pH of about 6.65, containing about 7 weight percent N, about 21 weight percent $P_2O_5$, and about 7 weight percent $K_2O$, consisting essentially of an aqueous solution of muriate of potash and ammonium salts of superphosphoric acid and in which the total $P_2O_5$ is distributed in the following proportions: 2.32 to 55.81 percent as ammonium orthophosphates, 6.97 to 49.30 percent as ammonium pyrophosphates, 5.31 to 24.98 percent as ammonium tripolyphosphates, in amounts up to 16.99 percent as ammonium tetrapolyphosphates, in amounts up to 12.64 percent as ammonium pentapolyphosphates, in amounts up to 9.75 percent as ammonium hexapolyphosphates, in amounts up to 8.62 percent as ammonium heptapolyphosphates, in amounts up to 7.85 percent as ammonium octapolyphosphates, in amounts up to 6.03 percent as ammonium nonapolyphosphates, and in amounts to 29.41 percent as higher ammonium polyphosphates.

References Cited in the file of this patent

UNITED STATES PATENTS

| | | |
|---|---|---|
| 1,146,222 | Willson et al. | July 13, 1915 |
| 1,878,997 | Adelantado | Sept. 27, 1932 |
| 2,022,672 | Kniskern | Dec. 3, 1935 |
| 2,270,518 | Ellis et al. | Jan. 20, 1942 |
| 2,770,538 | Vierling | Nov. 13, 1956 |
| 2,781,612 | Dugan | Feb. 19, 1957 |
| 2,869,996 | Vierling | Jan. 20, 1959 |

OTHER REFERENCES

Canadian Journal of Chemistry, vol. 34, January-June 1956, p. 790.